US009480928B2

(12) United States Patent
Park et al.

(10) Patent No.: US 9,480,928 B2
(45) Date of Patent: Nov. 1, 2016

(54) EXPERIENCE RIDE REPRESENTATION APPARATUS AND METHOD FOR REAL-SENSE MEDIA SERVICE BASED ON MULTI-VISION

(71) Applicant: Electronics and Telecommunications Research Institute, Daejeon (KR)

(72) Inventors: Sang-Wook Park, Daejeon (KR); Jong-Hyun Jang, Daejeon (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 0 days.

(21) Appl. No.: 14/710,024

(22) Filed: May 12, 2015

(65) Prior Publication Data
US 2015/0321107 A1   Nov. 12, 2015

(30) Foreign Application Priority Data

May 12, 2014  (KR) ........................ 10-2014-0056698

(51) Int. Cl.
| | | |
|---|---|---|
| A63G 31/16 | (2006.01) | |
| A63F 9/14 | (2006.01) | |
| G06K 9/00 | (2006.01) | |
| A63F 13/00 | (2014.01) | |

(52) U.S. Cl.
CPC ............... *A63G 31/16* (2013.01); *A63F 9/143* (2013.01); *G06K 9/00342* (2013.01)

(58) Field of Classification Search
CPC ...... A63G 31/00; A63G 31/16; A63F 13/00; A63F 13/06; A63F 13/10; G09B 9/058
USPC ....... 472/59–61, 130; 434/247, 253; 463/42, 463/43
See application file for complete search history.

(56) References Cited

U.S. PATENT DOCUMENTS

| | | | | |
|---|---|---|---|---|
| 4,856,771 A * | 8/1989 | Nelson | ............... | A63G 31/16 434/34 |
| 5,004,225 A * | 4/1991 | Krukovsky | ............ | A63G 31/16 472/131 |
| 5,961,195 A * | 10/1999 | Yoshimatsu | ........... | G09B 9/058 353/122 |
| 6,142,870 A * | 11/2000 | Wada | ...................... | A63F 13/06 434/253 |
| 6,716,106 B2 * | 4/2004 | Wang | ...................... | A63G 31/16 434/55 |
| 6,902,488 B2 * | 6/2005 | Hashimoto | ............ | A63G 31/16 434/55 |
| 2009/0075741 A1 * | 3/2009 | Milligan | ................ | A63G 31/16 472/60 |
| 2011/0014985 A1 | 1/2011 | Park et al. | | |

FOREIGN PATENT DOCUMENTS

| | | |
|---|---|---|
| KR | 1020100008774 A | 1/2010 |
| KR | 1020110007419 A | 1/2011 |
| KR | 1020120114770 A | 10/2012 |
| KR | 1020120132283 A | 12/2012 |
| KR | 101326944 B1 | 11/2013 |

\* cited by examiner

*Primary Examiner* — Kien Nguyen
(74) *Attorney, Agent, or Firm* — William Park & Associates Ltd.

(57) ABSTRACT

Disclosed herein are an experience ride representation apparatus and method for a real-sense media service based on a multi-vision. An experience ride representation apparatus for a real-sense media service based on a multi-vision in which a motion of a user is reflected so as to move in a plurality of screen units depending on a first signal received from the user, a second signal is transmitted to the user based on real-sense media contents reproduced on the screen unit, and metaverse contents are provided to a plurality of users when the screen unit is shared by the plurality of users.

15 Claims, 17 Drawing Sheets

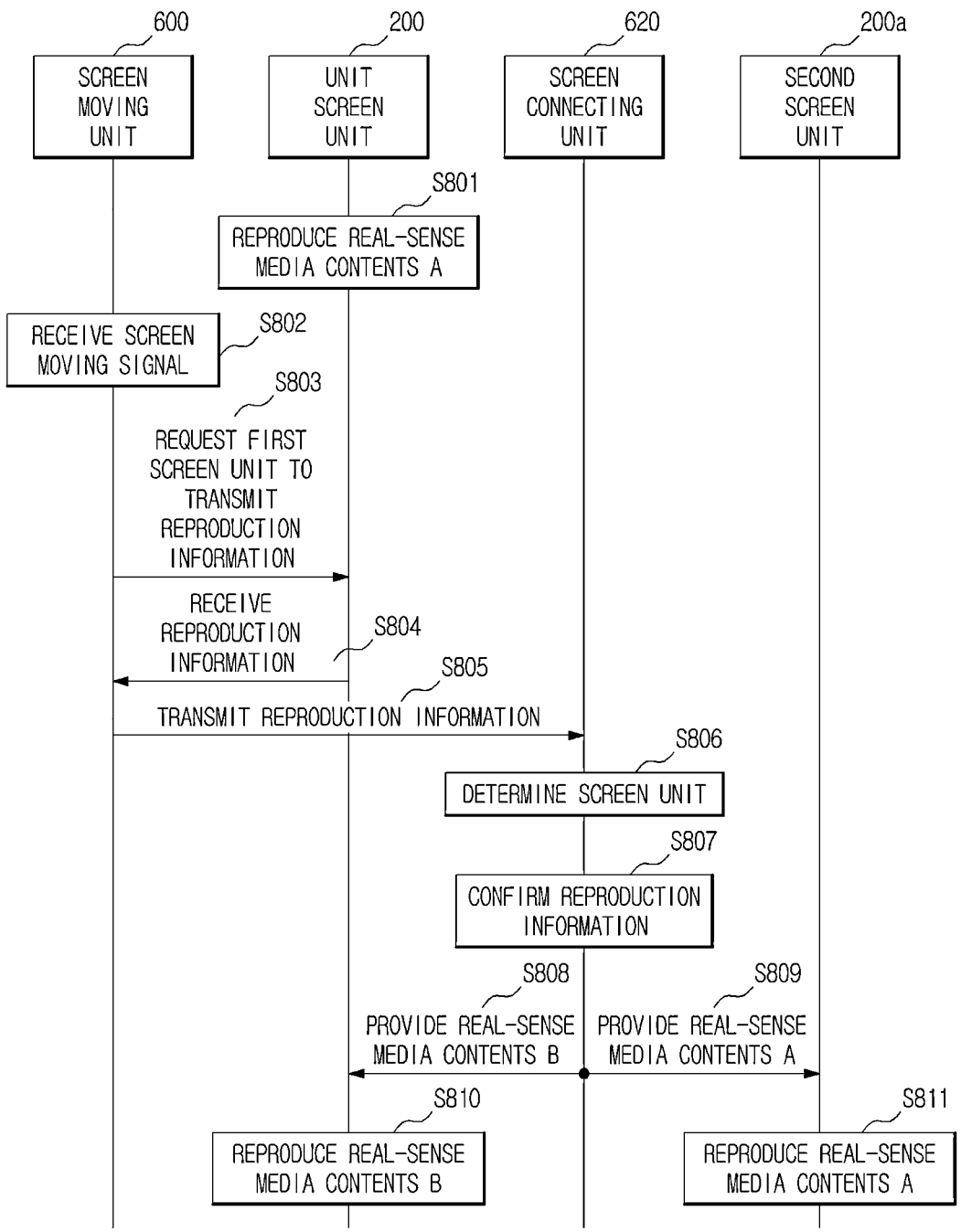

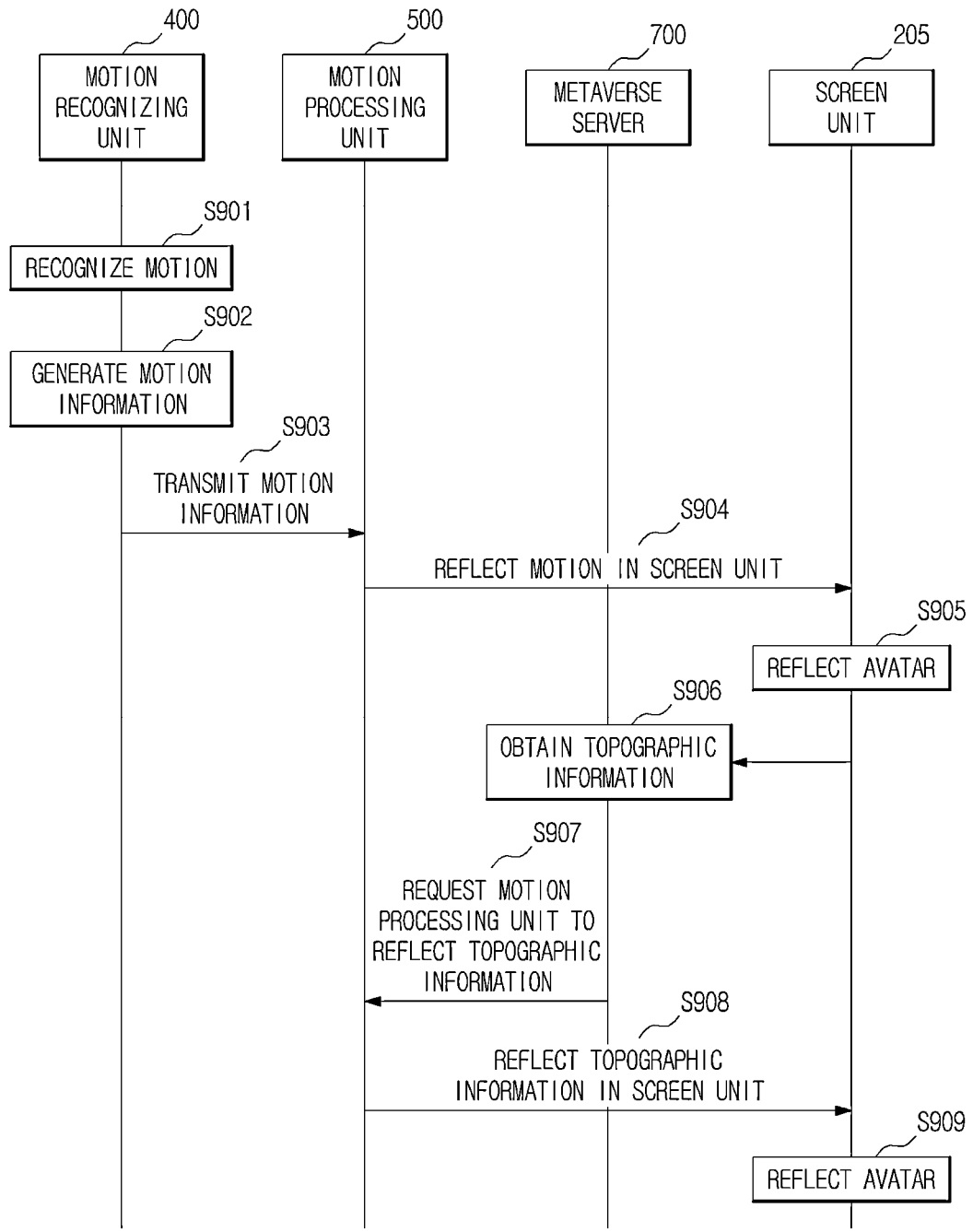

EXPERIENCE RIDE REPRESENTATION APPARATUS AND METHOD FOR REAL-SENSE MEDIA SERVICE BASED ON MULTI-VISION

CROSS REFERENCE TO RELATED APPLICATION

This application claims the benefit of Korean Patent Application No. 10-2014-0056698, filed on May 12, 2014, entitled "Experience Ride Representation Apparatus and Method for Real-Sense Media Service Based on Multi-Vision", which is hereby incorporated by reference in its entirety into this application.

BACKGROUND OF THE INVENTION

1. Technical Field

The present invention relates to an experience ride representation apparatus and method for a real-sense media service based on a multi-vision including motions in a 4D movie theater, a simulator, and a ride product, and more particularly, to an apparatus and a method for providing a ride control, various contents, and interactive experience service providing a realistic immersion sense together with an image in winter sports.

2. Description of the Related Art

Currently, a technology of maximizing a visual effect and an auditory effect through a traditional video apparatus and audio apparatus in order to provide realistic multimedia contents has been commercialized. Beyond providing the visual effect and the auditory effect, a real-sense experience service providing a motion to a user to increase an immersion sense has been provided in a 4D movie theater.

However, a motion and real-sense effect reproduction service authored and programmed in advance by a producer at the time of creating contents based on an image and then provided has a limitation in providing a real-sense representation effect interactive with the user or the contents.

In addition, an apparatus and a method for providing various services to other real-sense media contents and other users using a service specialized to one created image have not yet been suggested.

RELATED ART DOCUMENT

Patent Document

Korean Patent Laid-Open Publication No. 10-2010-0008774

SUMMARY OF THE INVENTION

An object of the present invention is to provide an experience ride representation apparatus and method for a real-sense media service based on a multi-vision capable of making an experience ride including real-sense media contents interactive.

Another object of the present invention is to provide an experience ride representation apparatus and method for a real-sense media service based on a multi-vision capable of allowing a user to compete with a plurality of users by recognizing a motion of the user and reflecting the motion in contents.

Still another object of the present invention is to provide an experience ride representation apparatus and method for a real-sense media service based on a multi-vision capable of increasing activation of real-sense media contents and increasing communication between users experiencing ride by allowing a plurality of users to share contents with each other in one studio through content and user management or allowing a user to freely share contents with other users depending on a motion that is to move to a screen.

According to an exemplary embodiment of the present invention, there is provided an experience ride representation apparatus for a real-sense media service based on a multi-vision in which a motion of a user is reflected so as to move in a plurality of screen units depending on a first signal received from the user, a second signal is transmitted to the user based on real-sense media contents reproduced on the screen unit, and metaverse contents are provided to a plurality of users when the screen unit is shared by the plurality of users.

According to another exemplary embodiment of the present invention, there is provided an experience ride representation apparatus for a real-sense media service based on a multi-vision, including: a content server providing real-sense media contents and real-sense effect data corresponding to the real-sense media contents; a plurality of screen units reproducing the real-sense media contents; a real-sense device providing a real-sense effect to a user based on the real-sense effect data; a motion recognizing unit recognizing a motion of the user to generate motion information; a motion processing unit reflecting the motion of the user in the screen unit based on the motion information; a screen moving unit requesting the motion processing unit to reflect the motion of the user in the screen unit corresponding to a screen moving signal when the motion recognizing unit receives the screen moving signal from the user; and a metaverse server providing metaverse contents shared by a plurality of users and metaverse real-sense effect data corresponding to the metaverse contents in the case in which motions of the plurality of users are reflected in the screen unit.

The content server may include a content speed controlling unit controlling a reproduction speed of the real-sense media contents reproduced on the screen unit depending on the motion information of the user.

The content server may include a content transmitting unit transmitting the real-sense media contents and the real-sense effect data to the screen unit through a communication network.

The screen unit may reflect the motion of the user as any one or more of an avatar and a character.

The motion information recognized by the motion recognizing unit from the motion of the user may include: pitch motion information on a motion ascending or descending based on a direction in which the user advances; yaw motion information on a motion rotating to the left or the right based on the direction in which the user advances; and roll motion information on a motion inclined to the left or the right based on the direction in which the user advances.

The experience ride representation apparatus for a real-sense media service based on a multi-vision may further include a screen connecting unit connecting real-sense media contents reproduced on the screen unit before the screen moving signal is received and real-sense media contents reproduced on the screen unit corresponding to the screen moving signal to each other, when the screen moving unit reflects the motion of the user in the screen unit corresponding to the screen moving signal.

The experience ride representation apparatus for a real-sense media service based on a multi-vision may further include a topographic information providing unit obtaining topographic information from any one of the real-sense media contents and the metaverse contents and requesting the motion processing unit to reflect a real-sense effect corresponding to the topographic information in the screen unit.

The topographic information providing unit may request the real-sense device to transfer a physical stimulus to the user through the real-sense device based on the topographic information.

According to still another exemplary embodiment of the present invention, there is provided an experience ride representation method for a real-sense media service based on a multi-vision, including: receiving a first signal from a user; reflecting a motion of the user so as to move in a plurality of screen units depending on the first signal; transmitting a second signal to the user based on real-sense media contents reproduced on the screen unit; and providing metaverse contents to a plurality of users when the screen unit is shared by the plurality of users.

According to yet still another exemplary embodiment of the present invention, there is provided an experience ride representation method for a real-sense media service based on a multi-vision, including: providing, by a content server, real-sense media contents and real-sense effect data corresponding to the real-sense media contents to a screen unit; reproducing, by the screen unit, the real-sense media contents; providing, by a real-sense device, a real-sense effect to a user based on the real-sense effect data; recognizing, by a motion recognizing unit, a motion of the user to generate motion information; reflecting, by a motion processing unit, the motion of the user in the screen unit based on the motion information; requesting, by a screen moving unit, the motion processing unit to reflect the motion of the user in the screen unit corresponding to a screen moving signal when the motion recognizing unit receives the screen moving signal from the user; and providing, by a metaverse server, metaverse contents shared by a plurality of users and metaverse real-sense effect data corresponding to the metaverse contents in the case in which motions of the plurality of users are reflected in the screen unit.

The experience ride representation method for a real-sense media service based on a multi-vision may further include controlling, by a content speed controlling unit, a reproduction speed of the real-sense media contents reproduced on the screen unit depending on the motion information of the user.

The experience ride representation method for a real-sense media service based on a multi-vision may further include transmitting, by a content transmitting unit, the real-sense media contents and the real-sense effect data to the screen unit through a communication network.

The experience ride representation method for a real-sense media service based on a multi-vision may further include connecting, by a screen connecting unit, real-sense media contents reproduced on the screen unit before the screen moving signal is received and real-sense media contents reproduced on the screen unit corresponding to the screen moving signal to each other, when the screen moving unit reflects the motion of the user in the screen unit corresponding to the screen moving signal.

The experience ride representation method for a real-sense media service based on a multi-vision may further include: obtaining, by a topographic information providing unit, topographic information from any one of the real-sense media contents and the metaverse contents and requesting the motion processing unit to reflect a real-sense effect corresponding to the topographic information in the screen unit; and requesting, by the topographic information providing unit, the real-sense device to transfer a physical stimulus to the user through the real-sense device based on the topographic information.

BRIEF DESCRIPTION OF THE DRAWINGS

FIG. 16 is a flow chart showing a method for providing real-sense media contents by the screen moving unit according to an exemplary embodiment of the present invention; and FIG. 17 is a flow chart showing a method for providing topographic information by the topographic information providing unit according to an exemplary embodiment of the present invention.

DESCRIPTION OF THE EXEMPLARY EMBODIMENTS

Figure 1:
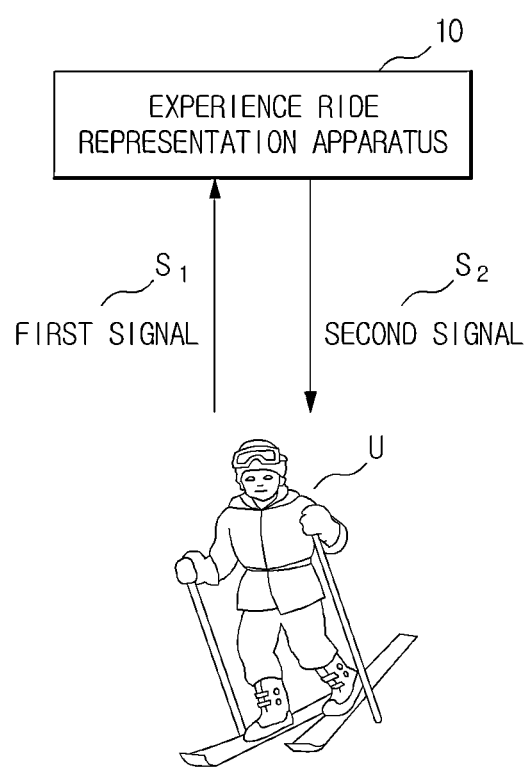
FIG. 1 is a conceptual diagram showing a signal transfer process between an experience ride representation apparatus for a real-sense media service based on a multi-vision according to an exemplary embodiment of the present invention and a user.

Specific structural or functional descriptions disclosed in the present specification will be provided only in order to describe exemplary embodiments of the present invention. Therefore, exemplary embodiments of the present invention may be implemented in various forms, and the present invention is not to be interpreted as being limited to exemplary embodiments described in the present specification.

Since exemplary embodiments of the present invention may be variously modified and may have several forms, they will be shown in the accompanying drawings and be described in detail in the present specification. However, it is to be understood that exemplary embodiments of the present invention are not limited to specific forms, but includes all modifications, equivalents, and substitutions included in the spirit and the scope of the present invention.

Terms such as 'first', 'second', or the like, may be used to describe various components, but these components are not to be construed as being limited to these terms. The terms are used only to distinguish one component from another component. For example, a 'first' component may be named a 'second' component and the 'second' component may also be named the 'first' component, without departing from the scope of the present invention.

It is to be understood that when one component is referred to as being "connected to" or "coupled to" another component, it may be connected directly to or coupled directly to another component or be connected to or coupled to another component with the other component interposed therebetween. On the other hand, it is to be understood that when one component is referred to as being "connected directly to" or "coupled directly to" another component, it may be connected to or coupled to another component without the other component interposed therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It is to be understood that terms "include", "have", or the like, used in the present specification specify the presence of features, numerals, steps, operations, components, parts, or a combination thereof stated in the present specification, but do not preclude the presence or addition of one or more other features, numerals, steps, operations, components, parts, or a combination thereof.

Unless indicated otherwise, all the terms used in the present specification, including technical and scientific terms, have the same meanings as meanings that are generally understood by those skilled in the art to which the present invention pertains. Terms generally used and defined in a dictionary are to be interpreted as the same meanings with meanings within the context of the related art, and are not to be interpreted as ideal or excessively formal meanings unless clearly indicated in the present specification.

Hereinafter, exemplary embodiments of the present invention will be described in detail with reference to the accompanying drawings.

FIG. 1 is a conceptual diagram showing a signal transfer process between an experience ride representation apparatus for a real-sense media service based on a multi-vision according to an exemplary embodiment of the present invention and a user.

Referring to FIG. 1, an experience ride representation apparatus 10 for a real-sense media service based on a multi-vision according to an exemplary embodiment of the present invention may reflect a motion of a user U so as to move in a plurality of screen units included in the experience ride representation apparatus 10, depending on a first signal $S_1$ received from the user U. Here, the first signal $S_1$ may include an electrical signal and a mechanical signal generated by the user U.

The user U may receive real-sense media contents through one screen unit and transmit the first signal $S_1$ to the experience ride representation apparatus 10, thereby receiving the real-sense media contents through a screen unit desired by him/her.

The user U may receive a second signal $S_2$ depending on the real-sense media contents reproduced by the screen unit. Here, the second signal $S_2$ may include a signal provided in order to allow the user U to be immersed in a specific situation through the real-sense media contents. For example, the second signal $S_2$ may include a signal stimulating five senses of the user U.

Figure 2:
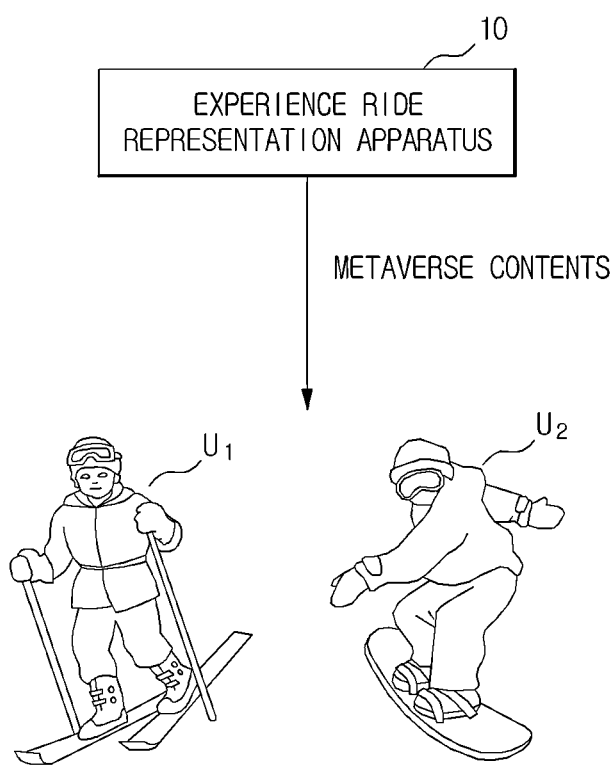
FIG. 2 is a conceptual diagram showing that the experience ride representation apparatus for a real-sense media service based on a multi-vision according to an exemplary embodiment of the present invention is shared by a plurality of users.

FIG. 2 is a conceptual diagram showing that the experience ride representation apparatus for a real-sense media service based on a multi-vision according to an exemplary embodiment of the present invention is shared by a plurality of users.

Referring to FIG. 2, when the experience ride representation apparatus 10 for a real-sense media service based on a multi-vision according to an exemplary embodiment of the present invention are shared by a plurality of users $U_1$ and $U_2$, the experience ride representation apparatus 10 may provide metaverse contents to the plurality of users $U_1$ and $U_2$.

Here, the metaverse contents may include image information allowing the users $U_1$ and $U_2$ to feel sharing the same situation with each other in one space.

Figure 3:
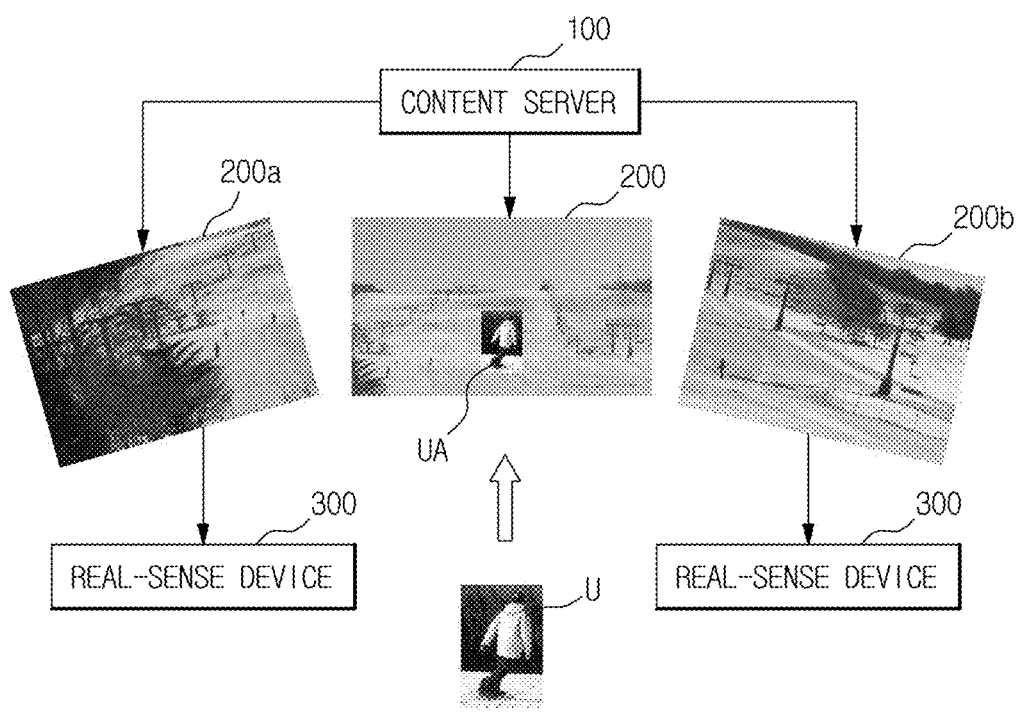
FIG. 3 is a conceptual diagram showing the experience ride representation apparatus for a real-sense media service based on a multi-vision according to an exemplary embodiment of the present invention.

FIG. 3 is a conceptual diagram showing the experience ride representation apparatus for a real-sense media service based on a multi-vision according to an exemplary embodiment of the present invention.

The experience ride representation apparatus for a real-sense media service based on a multi-vision according to an exemplary embodiment of the present invention may be configured to include a content server 100, a screen unit 200, a real-sense device 300, a motion recognizing unit 400, a motion processing unit 500, a screen moving unit 600, and a metaverse server 700.

Referring to FIG. 3, the content server 100 may provide real-sense media contents and real-sense effect data.

The real-sense media contents may include image information that may provide reality to the user U. As shown in FIG. 3, the real-sense media contents may include background image information of a ski resort.

The real-sense media contents provided by the content server 100 may be reproduced on the screen unit 200. The user U may receive the background image information reproduced on the screen unit 200 through a plurality of screen units 200, 200a, and 200b.

The real-sense effect data may include real-sense effect data corresponding to the real-sense media contents.

When the real-sense media contents are visually provided to the user U through the screen unit 200, the real-sense effect data may provide means capable of stimulating an auditory sense, a tactile sense, a taste sense, and an olfactory sense so that the user U may be further immersed in the real-sense media contents.

Here, the real-sense effect data may include information on a wind, a fragrance, and a sound that may be actually felt by the user U in the ski resort.

The user U of FIG. 3 may receive a fragrance of a forest appearing on a left screen unit 200a, strength of a wind that may be felt on a front screen unit 200, a shout of people heard from a slope appearing on a right screen unit 200b, and the like, from the real-sense device 300 while receiving a background image of the ski resort through three screen units 200, 200a, and 200b.

In an exemplary embodiment, the content server 100 may further include a content speed controlling unit 800 controlling a reproduction speed of the real-sense media contents reproduced on the screen unit 200 depending on motion information of the user U.

When the motion recognizing unit 400 receives a speed increase signal or a speed decrease signal from the user U, the content speed controlling unit 800 may increase an immersion sense of the user U by a method of increasing or decreasing a speed at which the real-sense media contents are provided.

In another exemplary embodiment, the content server 100 may further include a content transmitting unit 900 transmitting the real-sense media contents and the real-sense effect data to the screen unit 200 through a communication network.

The content transmitting unit 900 may transmit the real-sense media contents and the real-sense effect data to the screen unit 200 positioned at a short distance or a long distance.

Although the case in which the content server 100 is disposed at a position close to the screen unit 200 has been shown in FIG. 3, the user U and the screen unit 200 may be disposed in a first space, the content server 100 may be disposed in a second space in a form of a server operated by a communication company, and the user U may receive a service from the content server 100 disposed at a remote place through a predetermined communication network in various exemplary embodiments.

Here, the communication network may include a wired communication network and a wireless communication network. The wireless communication network may include a wireless local area network (WLAN), a Wi-Fi, a wireless broadband (Wibro), a world interoperability for microwave access (Wimax), a high speed downlink packet access (HSDPA), an IEEE 802.16, a long term evolution (LTE), a wireless mobile broadband service (WMBS), and the like.

In addition, a short range communication technology may include Bluetooth, radio frequency identification (RFID), infrared data association (IrDA), ultra wideband (UWB), ZigBee, near field communication (NFC), and the like.

In addition, a wired communication technology may include universe serial bus (USB), Ethernet, serial communication, optical/coaxial cable, and the like.

The screen unit 200 may reproduce the real-sense media contents.

As shown in FIG. 3, the screen unit 200 may be implemented by a display unit including the plurality of screen units 200, 200a, and 200b.

The screen unit 200 may reproduce different images depending on a visual point of the user U on a plurality of display units in reproducing the real-sense media contents.

The display unit may be any one of a liquid crystal display (LCD), a single-chip digital light processing (DLP) projector, a three-chip DLP projector, a cathode ray tube (CRT), a plasma display panel (PDP), a liquid crystal on silicon (LCS), holographic images on transparent screen, an organic light emitting diode (OLED), and an LED electric bulletin board.

The real-sense device 300 may receive the real-sense effect data and provide a real-sense effect to the user U based on the real-sense effect data. The real-sense device 300 may include a wind generating apparatus, a fragrance generating apparatus, and a sound generating apparatus.

Further, the real-sense device 300 may provide predetermined movement information to the user U depending on movement of the user U and the real-sense media contents.

For example, in the case in which the user U encounters an obstacle while snowboarding, impact, or the like, generated by the obstacle may be provided to the user U.

Here, a physical stimulus including the impact, or the like, generated by the obstacle may be provided to the user U through a mechanical apparatus. However, the present invention is not limited to a specific mechanical apparatus, but may be variously implemented by those skilled in the art.

Figure 4:
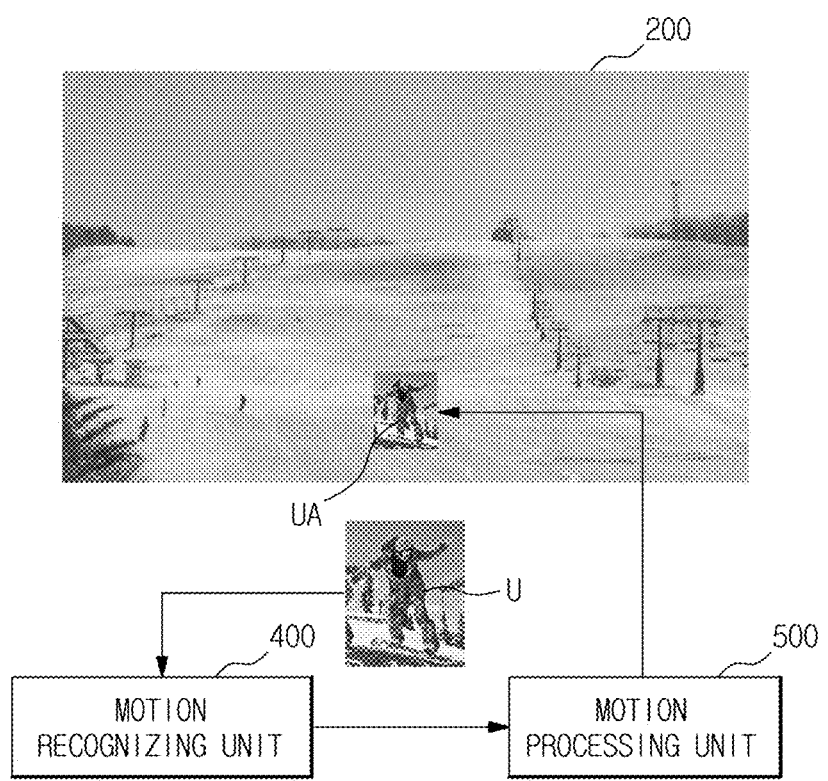
FIGS. 4 and 5 are conceptual diagrams showing a motion recognizing unit and a motion processing unit according to an exemplary embodiment of the present invention.

FIG. 4 is a conceptual diagram showing a motion recognizing unit and a motion processing unit according to an exemplary embodiment of the present invention.

Referring to FIG. 4, the motion recognizing unit 400 may recognize the motion of the user U to generate the motion information.

The motion recognizing unit 400 may include a plurality of cameras in order to recognize the motion information of the user U.

In another method, the motion recognizing unit 400 may recognize a movement, an action, and a motion of the user U using a signal generating apparatus and a predetermined sensor and convert the recognized movement, action, and motion into an electrical signal.

As a motion recognition method, various methods may be used, and the present invention is not limited to a special motion recognition method.

The motion processing unit 500 may reflect the motion of the user U in the screen unit 200 based on the motion information received from the motion recognizing unit 400.

Viewing the screen unit 200 FIG. 4, it may be confirmed that a character or an avatar UA having the same shape as that of the user U is displayed on the screen unit 200.

In another exemplary embodiment, the user U may set a shape displayed on the screen unit 200 to a specific character shape.

Figure 5:
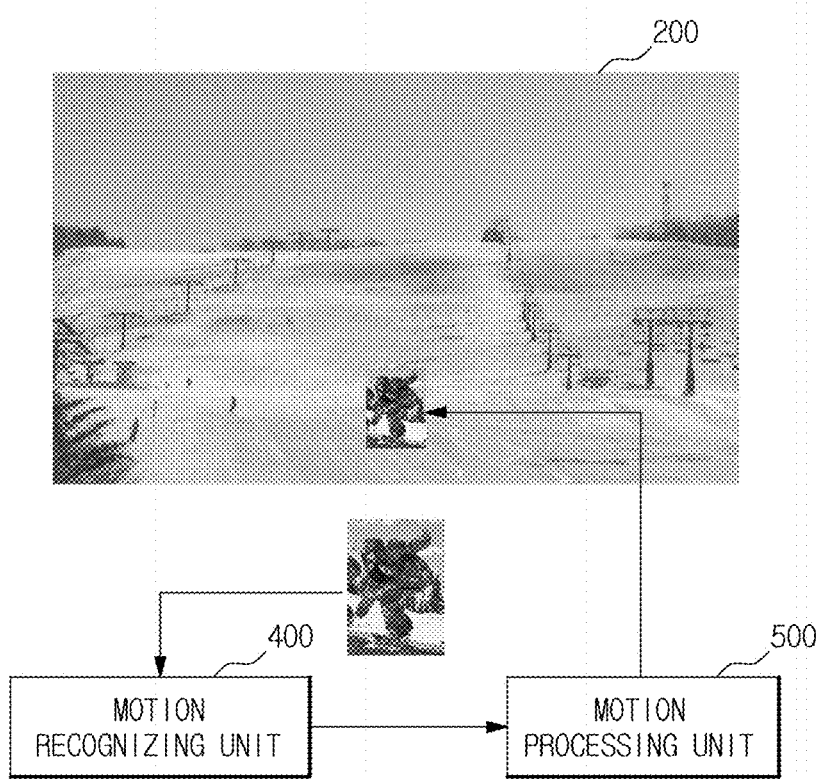

Comparing FIGS. 4 and 5 with each other, it may be confirmed that a form of the character UA displayed on the screen unit 200 is changed depending on movement of the user U.

In order to reflect the form of the user U in the screen unit 200, the motion recognizing unit 400 may include cameras, or the like, and the number of cameras recognizing the form of the user U may be plural.

The motion processing unit 500 may use a predetermined motion algorithm in order to represent the form of the user U at various angles. However, the present invention is not limited to a specific motion algorithm.

Figure 6:
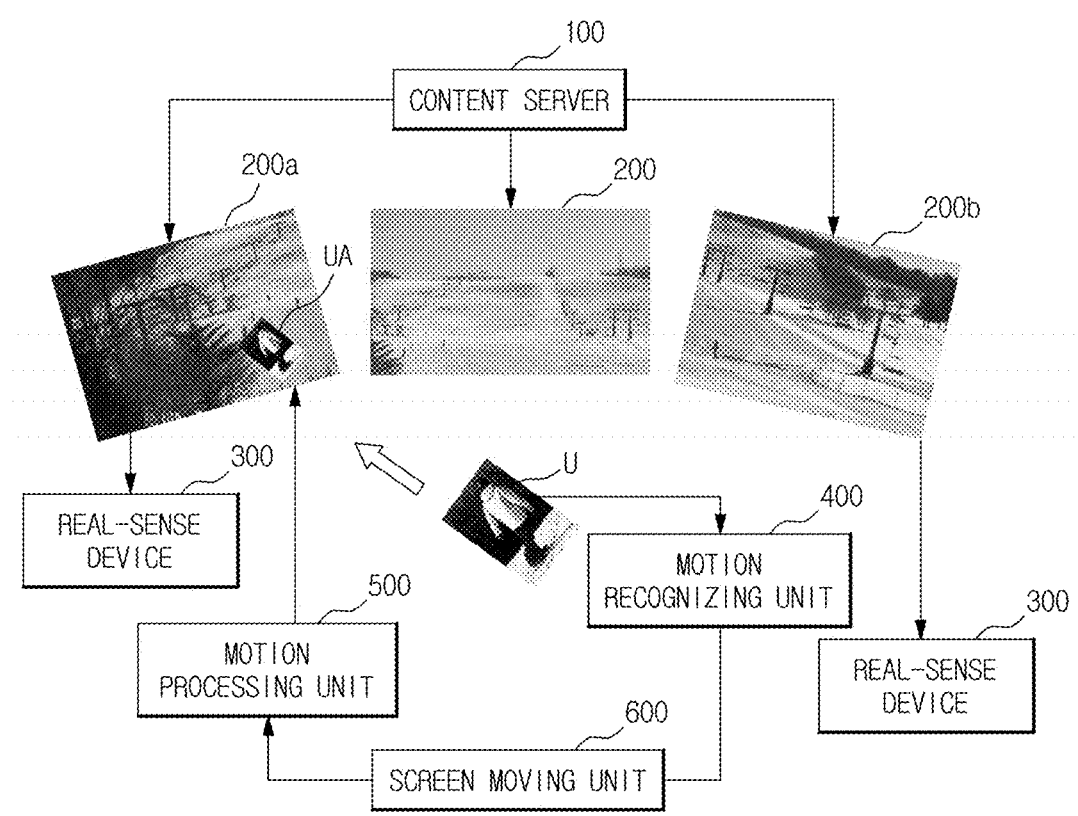
FIG. 6 is a conceptual diagram showing a process in which a user moves to a plurality of screens by a screen moving unit according to an exemplary embodiment of the present invention.

FIG. 6 is a conceptual diagram showing a process in which a user moves to a plurality of screens by a screen moving unit according to an exemplary embodiment of the present invention.

Referring to FIG. 6, the screen moving unit 600 may request the motion processing unit 500 to reflect the motion of the user U in the screen unit 200 corresponding to a screen moving signal when the motion recognizing unit 400 receives the screen moving signal from the user U.

The user U may transfer the screen moving signal to the motion recognizing unit 400. The screen moving signal may include a mechanical or electrical signal generated by the user U.

The motion recognizing unit 400 may transfer the screen moving signal to the screen moving unit 600. Here, the screen moving unit 600 may determine the screen unit 200 corresponding to the screen moving signal and request the motion processing unit 500 to reflect the motion of the user U in the determined screen unit 200.

Although the form of the user U may be confirmed on the screen unit 200 positioned at the front in FIG. 3, it may be confirmed that the form of the user U appears in the screen unit 200a positioned at the left by transmitting the screen moving signal.

For example, in the case in which an intermediate level course is present on the screen unit 200a positioned at the left during a period in which the user U performs an exercise at a beginner course displayed on the screen unit 200 before moving to the screen, he/she may move to the screen unit 200a positioned at the left by a method of transmitting the screen moving signal to the motion recognizing unit 400 and then start the exercise at the intermediate level course.

Figure 7:
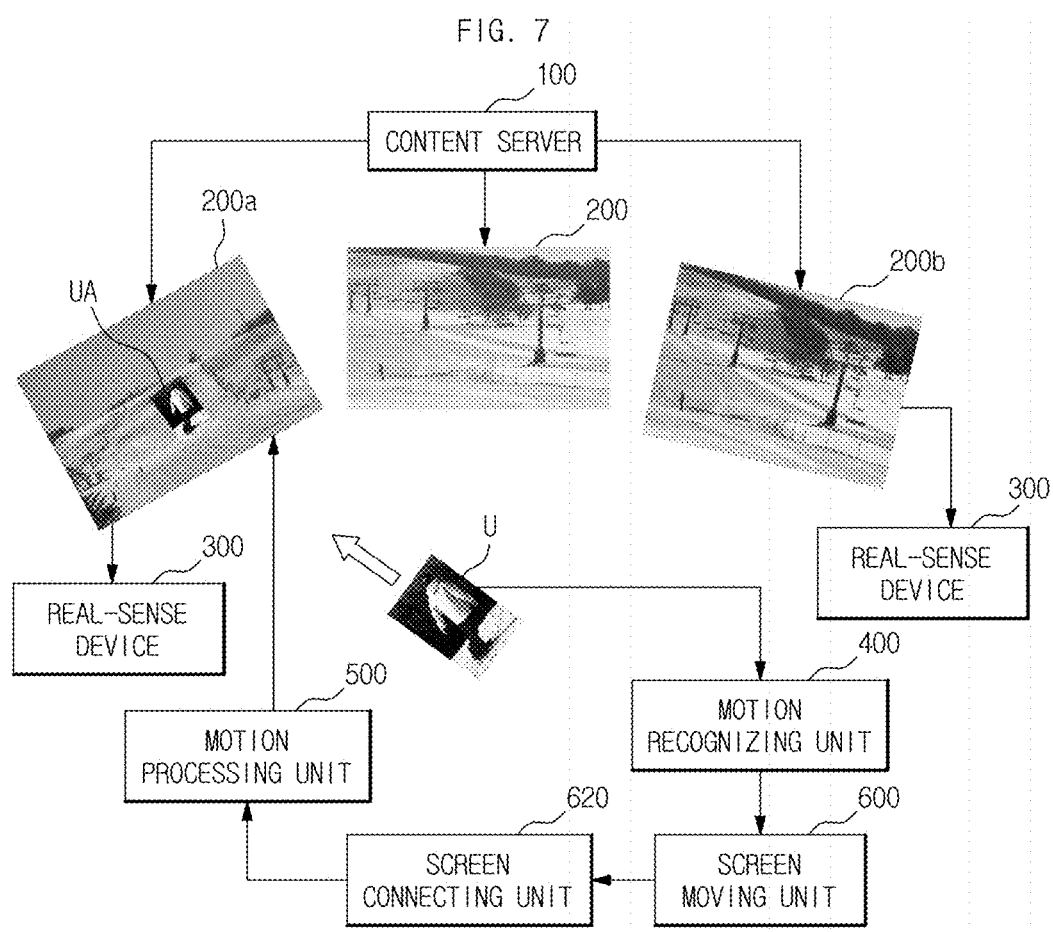
FIG. 7 is a diagram showing a method in which a screen connecting unit according to an exemplary embodiment of the present invention connects an image reproduced by a screen unit.

FIG. 7 is a diagram showing a method in which a screen connecting unit according to an exemplary embodiment of the present invention connects an image reproduced by a screen unit.

Referring to FIG. 7, the experience ride representation apparatus 10 for a real-sense media service based on a multi-vision according to an exemplary embodiment of the present invention may further include a screen connecting unit 620.

The screen connecting unit 620 may connect real-sense media contents reproduced on the screen unit 200 before the screen moving signal is received and real-sense media contents reproduced on the screen unit 200a corresponding to the screen moving signal to each other, when the screen moving unit 600 reflects the motion of the user U in the screen unit 200a corresponding to the screen moving signal.

Although the form UA of the user U is reflected in the screen unit 200a positioned at the left depending on the screen moving signal of the user U in FIG. 6, the form UA of the user U is reflected in the screen unit 200a positioned at the left and a background screen image that has appeared on the front screen unit 200 is also reproduced on the screen unit 200a positioned at the left through the screen connecting unit 620 in FIG. 7.

That is, the real-sense media contents reproduced on the screen unit 200 positioned at the front of FIG. 6 correspond to the real-sense media contents reproduced on the screen unit 200a positioned at the left of FIG. 7.

Therefore, the user may enjoy riding while moving to the plurality of screen units 200, 200a, and 200b through the screen moving unit 600 and receive seamless real-sense media contents through the screen connecting unit 620.

In an exemplary embodiment of the present invention, the screen moving unit 600 and the screen connecting unit 620 may be simultaneously operated.

Figure 8:
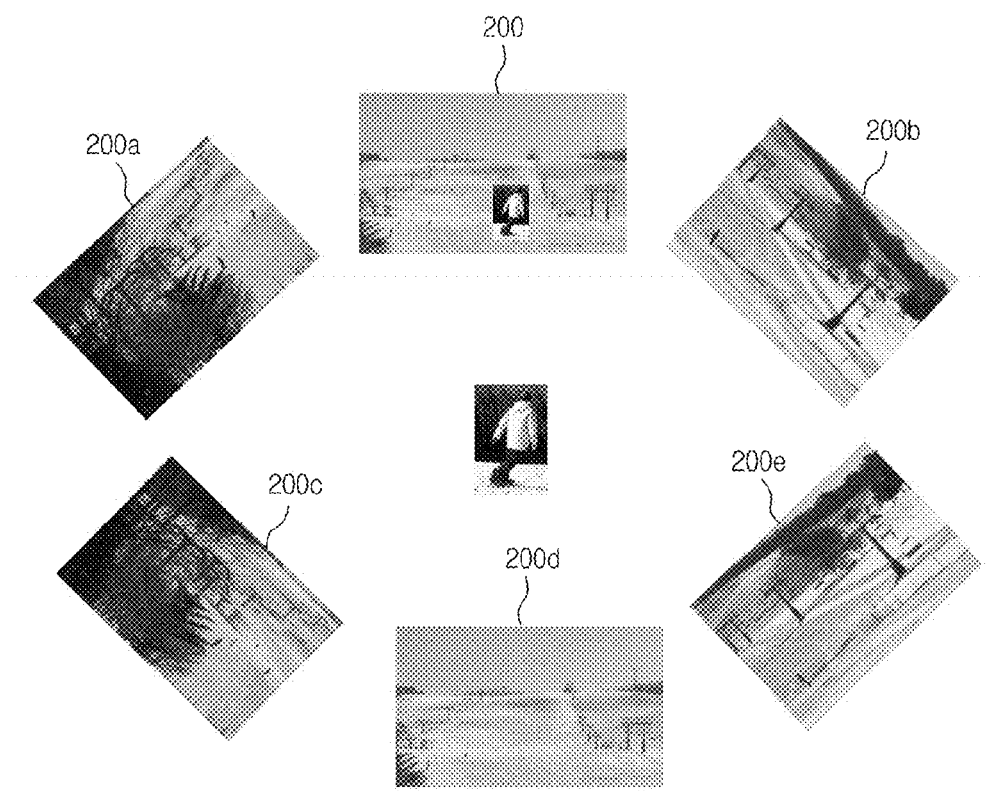
FIG. 8 is a diagram showing an example in the case in which the number of screen units according to an exemplary embodiment of the present invention is plural.

Although only three screen units 200, 200a, and 200b have been shown for assisting in the understanding in FIG. 6, when six screen units 200, 200a, 200b, 200c, 200d, and 200e are provided as shown in FIG. 8, the user U may freely move to the six screen units 200, 200a, 200b, 200c, 200d, and 200e.

Figure 9:
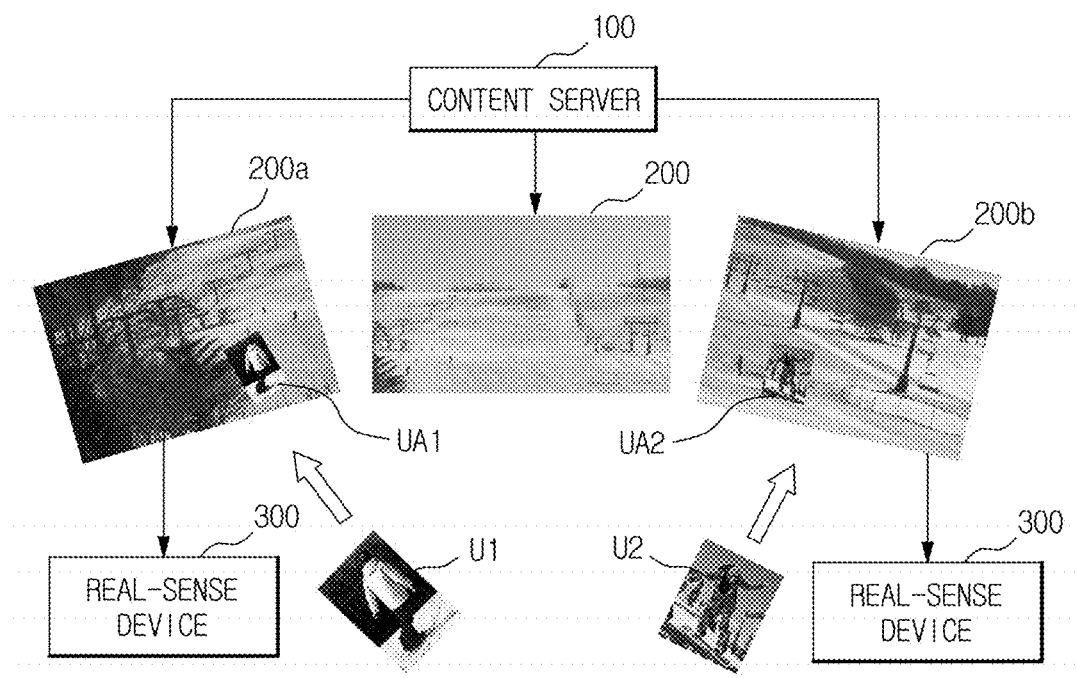
FIGS. 9 and 10 are conceptual diagrams showing that a plurality of users share the screen unit with each other by a metaverse server according to an exemplary embodiment of the present invention.
Figure 10:
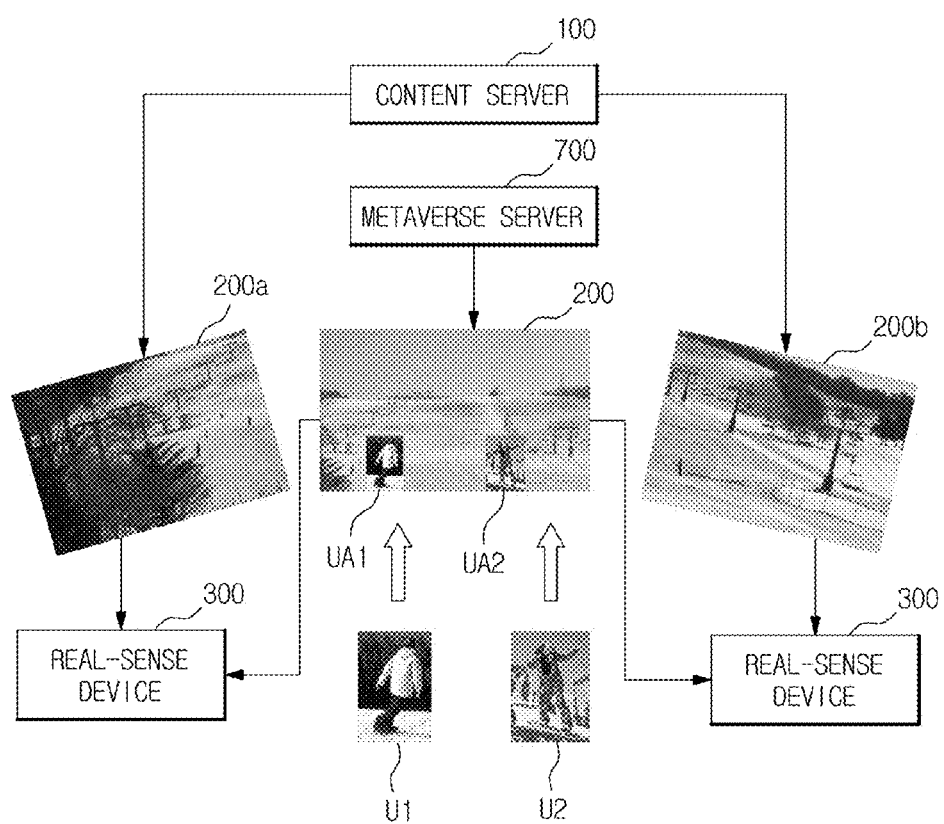

FIGS. 9 and 10 are conceptual diagrams showing that a plurality of users share the screen unit with each other by a metaverse server according to an exemplary embodiment of the present invention.

Referring to FIGS. 9 and 10, the metaverse server 700 according to an exemplary embodiment of the present invention may provide metaverse contents shared by the plurality of users $U_1$ and $U_2$ and metaverse real-sense effect data corresponding to the metaverse contents to the plurality of users $U_1$ and $U_2$ in the case in which motions of the plurality of users $U_1$ and $U_2$ are reflected in the screen units 200, 200a, and 200b.

In FIG. 9, a user A $U_1$ is performing riding through the screen unit 200a positioned at the left. In FIG. 9, a user B $U_2$ is performing riding through the screen unit 200b positioned at the right.

In FIG. 10, the user A $U_1$ and the user B $U_2$ share the screen unit 200 positioned at the center with each other. Here, the metaverse server 700 may provide the metaverse contents and the metaverse real-sense effect to the screen unit 200 positioned at the center.

The user A $U_1$ may perform the riding while sharing the screen unit 200 positioned at the center with the user B $U_2$. Here, the screen unit 200a positioned at the left of the user A $U_1$ may be a personal screen unit 200a of the user A $U_1$. The screen unit 200a positioned at the left of the user A $U_1$ may still receive the real-sense media contents and the real-sense effect data from the content server 100.

The user B $U_2$ may perform the riding while sharing the screen unit 200 positioned at the center with the user A $U_1$. Here, the screen unit 200b positioned at the right of the user B $U_2$ may be a personal screen unit 200b of the user B $U_2$. The screen unit 200b positioned at the right of the user B $U_2$ may still receive the real-sense media contents and the real-sense effect data from the content server 100.

Figure 11:
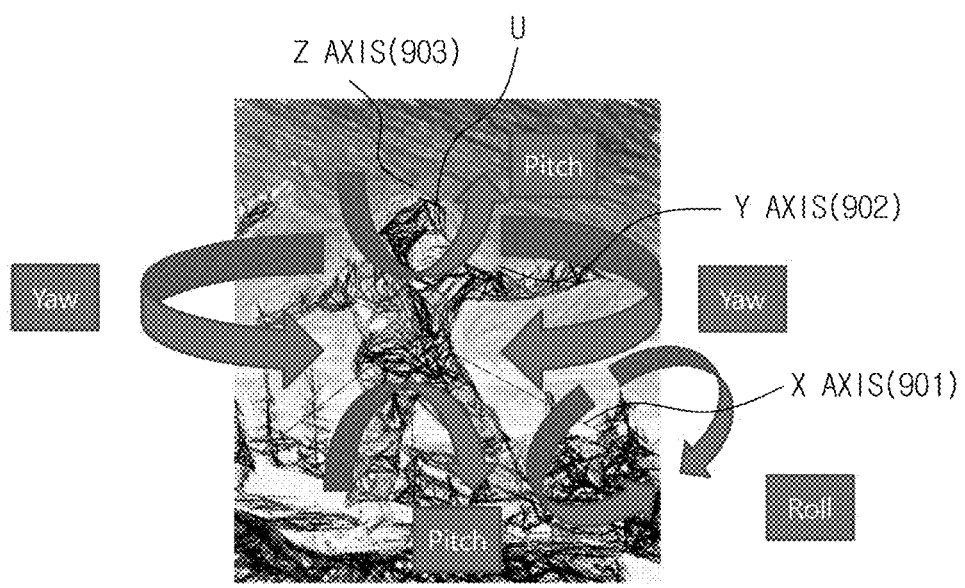
FIG. 11 is a diagram showing a kind of motion information recognized by the motion recognizing unit according to an exemplary embodiment of the present invention from a motion of the user.

FIG. 11 is a diagram showing a kind of motion information recognized by the motion recognizing unit according to an exemplary embodiment of the present invention from a motion of the user.

Referring to FIG. 11, the motion information may include pitch motion information, yaw motion information, and roll motion information.

The pitch motion information may include information on a motion ascending or descending based on a direction in which the user U advances. Here, the direction in which the user U advances may be an increase direction in an X axis 901.

The pitch motion information may include a motion ascending in a positive (+) direction of a Z axis 903 and a motion descending in a negative (−) direction of the Z axis 903 when the direction in which the user U advances is the X axis 901. That is, the pitch motion information may include a motion rotating based on a Y axis 902.

The yaw motion information may include motion information on a motion rotating to the left or the right based on the direction in which the user U advances. The yaw motion information may include a motion rotating based on the Z axis 903 when the direction in which the user U advances is the X axis 901.

The roll motion information may include motion information on a motion inclined to the left or the right based on the direction in which the user U advances. The roll motion information may include a motion rotating based on the X axis 901 when the direction in which the user U advances is the X axis 901.

When the motion recognizing unit 400 receives the motion information of the user U including the pitch motion information, the yaw motion information, and the roll motion information, the motion of the user U may be reflected in the screen unit 200 through the motion processing unit 500.

Figure 12:
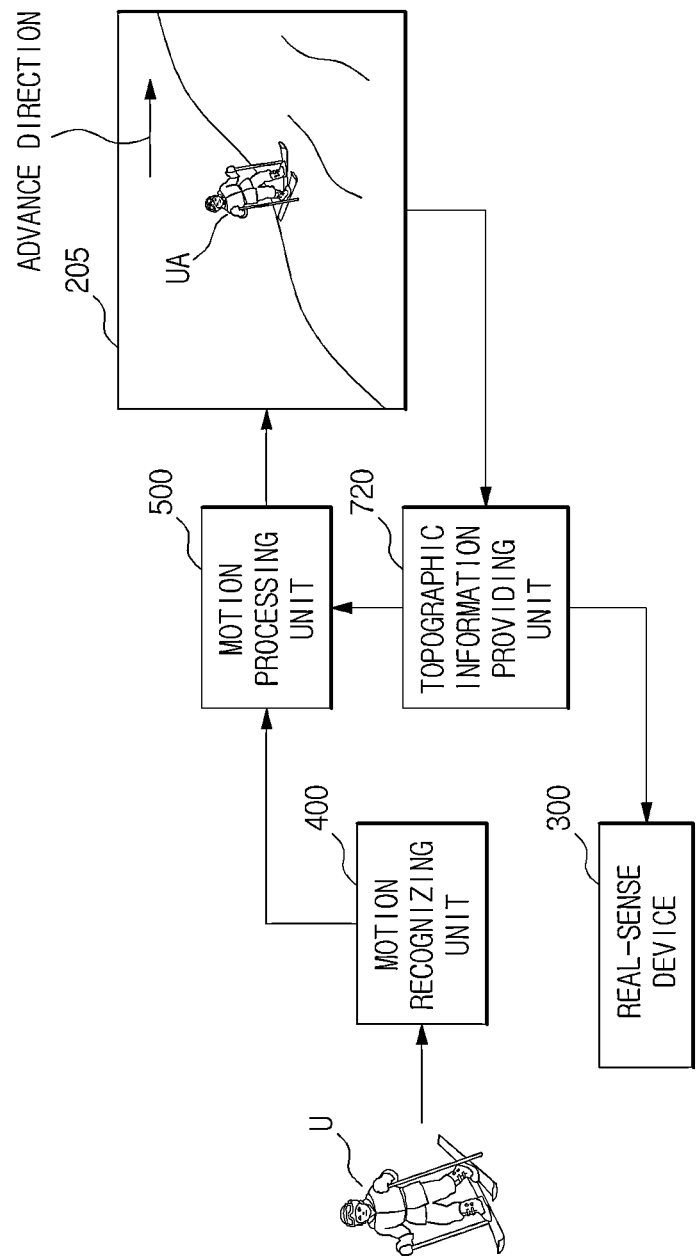
FIG. 12 is a conceptual diagram showing that a topographic information providing unit according to an exemplary embodiment of the present invention provides topographic information included in contents to the user.

FIG. 12 is a conceptual diagram showing that a topographic information providing unit according to an exemplary embodiment of the present invention provides topographic information included in contents to the user.

Referring to FIG. 12, a topographic information providing unit 720 according to an exemplary embodiment of the present invention may obtain topographic information from the real-sense media contents or the metaverse contents and provide a real-sense effect corresponding to the topographic information to the user U.

Real-sense media contents ascending in an advance direction are reproduced on a screen unit 205. The topographic information providing unit 720 may obtain the topographic information of the real-sense media contents reproduced on the screen unit 205 and provide an effect corresponding to the topographic information to the user.

When the motion recognizing unit 400 generates the motion information of the user U and the motion processing unit 500 reflects the motion of the user U in the screen unit 205 based on the motion information, the topographic information providing unit 720 may request the screen unit 205 to correct the motion of the user U depending on the topographic information and reflect the corrected motion.

For example, in the case in which the user U transmits a signal for increasing a speed of the avatar to the motion recognizing unit 400, even in the case in which the motion recognizing unit 400 generates speed increase motion information and transmits the speed increase motion information to the motion processing unit 500, the topographic information providing unit 720 may obtain topographic information indicating that a current topography is an ascent and provide the obtained topographic information to the motion processing unit 500, thereby allowing a speed decreased from a speed requested by the user U by a predetermined amount to be reflected in the avatar.

In another example, even in the case in which the motion of the user U is recognized to generate the motion information including the pitch motion information, the yaw motion information, and the roll motion information and transfer the generated motion information to the motion processing unit 500, the motion processing unit 500 may reflect a corrected motion in the screen unit 205 in consideration of the topographic information received from the topographic information providing unit 720.

In addition, the topographic information providing unit 720 may provide a physical stimulus to the user U by a method of transmitting the topographic information to the real-sense device 300.

For example, in the case in which the topographic information providing unit 720 obtains topographic information to which a predetermined gradient is applied from the real-sense media contents, it may allow the predetermined gradient to be felt through a predetermined apparatus connected to the real-sense device 300.

Figure 13:
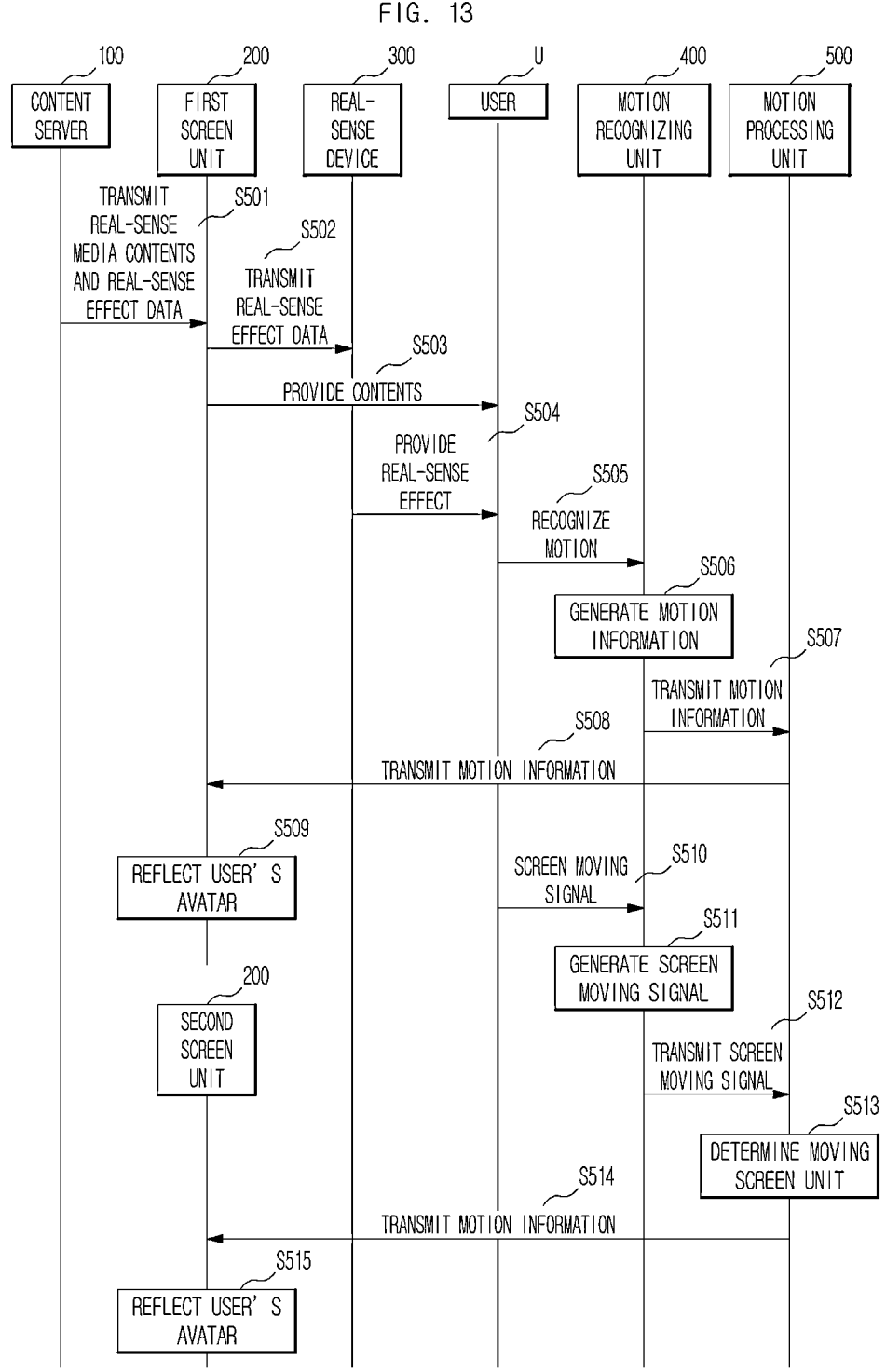
FIG. 13 is a flow chart showing an experience ride representation method for a real-sense media service based on a multi-vision according to an exemplary embodiment of the present invention.

FIG. 13 is a flow chart showing an experience ride representation method for a real-sense media service based on a multi-vision according to an exemplary embodiment of the present invention.

Referring to FIG. 13, in S501, the content server 100 may provide the real-sense media contents and the real-sense effect data corresponding to the real-sense media contents to the first screen unit 200.

In S502, the first screen unit 200 may provide the real-sense effect data to the real-sense device 300.

In S503, the first screen unit 200 may reproduce the real-sense media contents to provide the real-sense media contents to the user U.

In S504, the user U may receive the real-sense effect from the real-sense device 300.

In S505, the motion recognizing unit 400 may recognize the motion from the user U during a period in which the user U receives the real-sense media contents and the real-sense effect data.

The motion recognizing unit 400 may generate the motion information in S506 and transmit the generated motion information to the motion processing unit 500 in S507.

In S508, the motion processing unit 500 may transmit the motion information to the first screen unit 200.

In S509, the first screen unit 200 may reflect the motion of the user U in an avatar form.

In S510, the motion recognizing unit 400 may receive the screen moving signal from the user U.

The motion recognizing unit 400 may generate the screen moving signal in S511 and transmit the screen moving signal to the motion processing unit 500 in S512.

When the motion processing unit 500 determines the screen unit 200*a* corresponding to the screen moving signal in S513, it may transmit the motion information to the second screen unit 200*a* in S514.

In S515, the second screen unit 200*a* may reflect the avatar UA of the user U.

Figure 14:
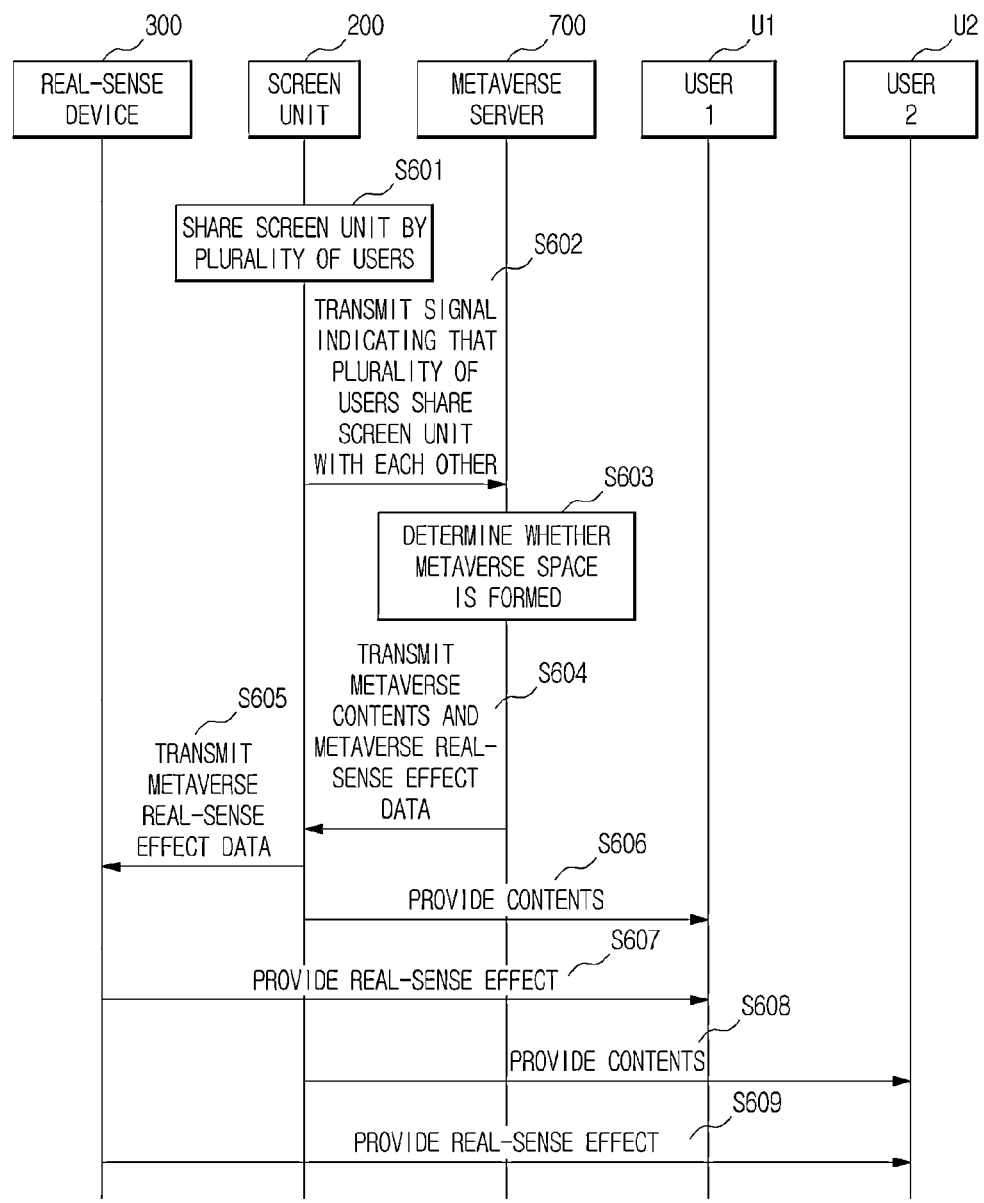
FIG. 14 is a flow chart showing a method for providing a shared screen by the metaverse server according to an exemplary embodiment of the present invention.

FIG. 14 is a flow chart showing a method for providing a shared screen by the metaverse server according to an exemplary embodiment of the present invention.

Referring to FIG. 14, in S601, the screen unit 200 may recognize that the plurality of users $U_1$ and $U_2$ share the screen unit 200 with each other.

In S602, the screen unit 200 may transmit a signal indicating that the plurality of users $U_1$ and $U_2$ share the screen unit 200 with each other to the metaverse server 700.

The metaverse server 700 may determine whether a metaverse space is formed in S603 and transmit the metaverse contents and the metaverse real-sense effect data to the screen unit 200 in S604.

In S605, the screen unit 200 may transmit the metaverse real-sense effect data to the real-sense device 300.

In S606 and S607, the user 1 $U_1$ may receive the metaverse contents and the metaverse real-sense effect data through the screen unit 200.

In S608 and S609, the user 2 $U_2$ may receive the metaverse contents and the metaverse real-sense effect data through the screen unit 200.

That is, the user 1 $U_1$ and the user 2 $U_2$ may share the same screen unit 200 with each other.

Figure 15:
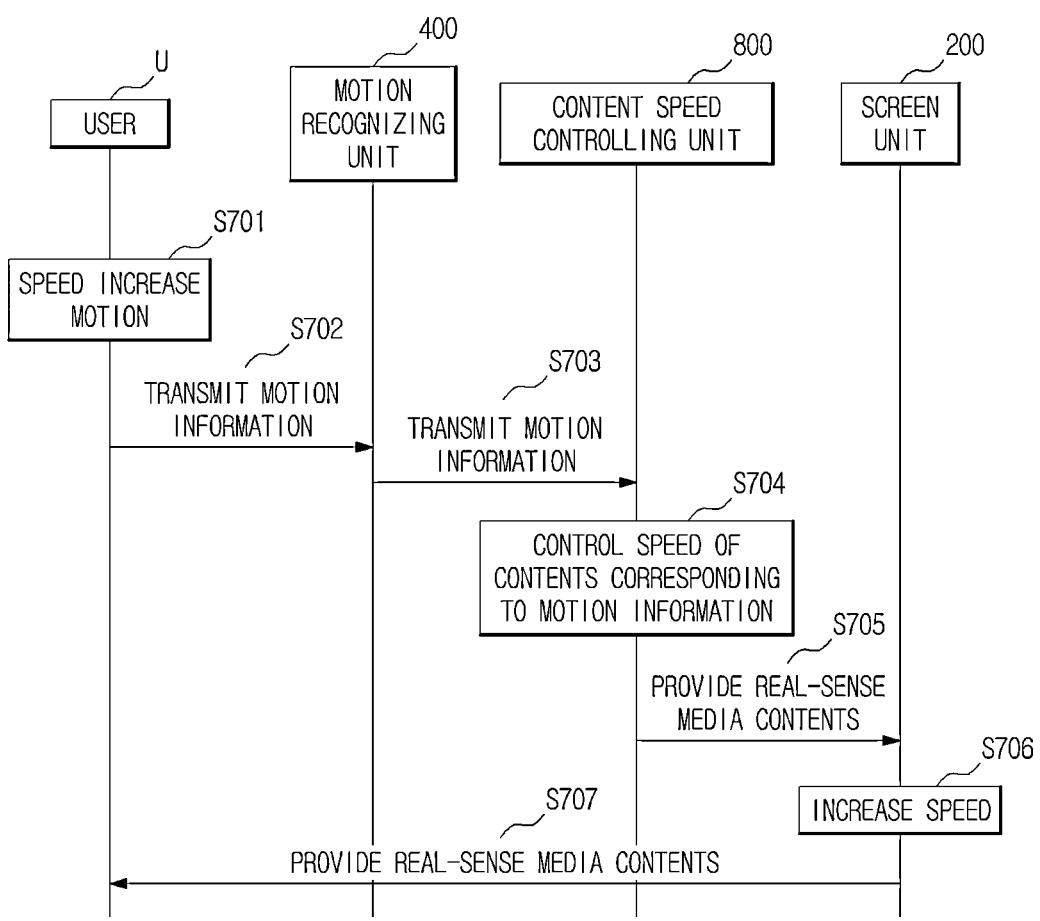
FIG. 15 is a flow chart showing a method for providing real-sense media contents by a speed controlling unit according to an exemplary embodiment of the present invention.

FIG. 15 is a flow chart showing a method for providing real-sense media contents by a speed controlling unit according to an exemplary embodiment of the present invention. Referring to FIG. 15, in S701, the user U may generate a speed increase motion. The speed increase motion may be differently set depending on setting of the user U.

In S702, motion information may be transmitted to the motion recognizing unit 400.

In S703, the motion recognizing unit 400 may transmit the motion information to the content speed controlling unit 800.

The content speed controlling unit 800 may determine a providing speed of real-sense media contents corresponding to the motion information in S704 and provide the real-sense media contents to the screen unit 200 in S705.

The screen unit 200 may provide the real-sense media contents of which a speed is increased in S706, and the user U may receive the real-sense media contents of which the speed is increased in S707.

FIG. 16 is a flow chart showing a method for providing real-sense media contents by the screen moving unit according to an exemplary embodiment of the present invention.

Referring to FIG. 16, in S801, the first screen unit 200 may reproduce real-sense media contents A.

In S802, the screen moving unit 600 may receive the screen moving signal from the motion recognizing unit 400.

When the screen moving unit 600 requests the first screen unit 200 to transmit reproduction information in S803, the screen moving unit 600 may receive the reproduction information from the first screen unit 200 in S804.

When the screen moving unit 600 transmits the reproduction information to the screen connecting unit 620 in S805, the screen connecting unit 620 may determine the screen unit 200 corresponding to the screen moving signal S806.

The screen connecting unit 620 may confirm the reproduction information in S807, and provide the real-sense media contents A to the second screen unit 200a in S808.

In S809, the screen connecting unit 620 may provide real-sense media contents B to the first screen unit 200. Here, the real-sense media contents A and the real-sense media contents B may be distinguished from each other.

In S810, the first screen unit 200 may reproduce the real-sense media contents B.

In S811, the second screen unit 200a may reproduce the real-sense media contents A.

As a result, the user U may receive the real-sense media contents A from the second screen unit 200a.

FIG. 17 is a flow chart showing a method for providing topographic information by the topographic information providing unit according to an exemplary embodiment of the present invention.

Referring to FIG. 17, in S901, the motion recognizing unit 400 may recognize the motion of the user.

In S902, the motion recognizing unit 400 may generate the motion information based on the motion of the user.

In S903, the motion recognizing unit 400 may transmit the motion information to the motion processing unit 500.

In S904, the motion processing unit 500 may request the screen unit 205 to reflect the motion of the user.

In S905, the screen unit 205 may reflect the motion of the user as the avatar.

In S906, the topographic information providing unit 700 may obtain the topographic information from the real-sense media contents transmitted from the screen unit 205.

In S907, the topographic information providing unit 700 may request the motion processing unit 500 to reflect the topographic information.

In S908, the motion processing unit 500 may request the screen unit 205 to reflect the topographic information.

In S909, the screen unit 205 may display the avatar in which the topographic information is reflected.

In another exemplary embodiment, a step in which the topographic information providing unit 720 requests the real-sense device 300 to transfer the physical stimulus to the user through the real-sense device 300 based on the topographic information may be further performed.

The experience ride representation apparatus and method for a real-sense media service based on a multi-vision according to an exemplary embodiment of the present invention may provide an experience ride including real-sense media contents in an interactive scheme.

The experience ride representation apparatus and method for a real-sense media service based on a multi-vision according to an exemplary embodiment of the present invention recognize a motion of a user and reflect the recognized motion in contents, thereby making it possible to provide a service allowing a user to compete with a plurality of users.

The experience ride representation apparatus and method for a real-sense media service based on a multi-vision according to an exemplary embodiment of the present invention allow a plurality of users to share contents with each other in one studio through content and user management or allow a user to freely share contents with other users depending on a motion that is to move to a screen, thereby making it possible to increase activation of real-sense media contents and increase communication between users experiencing ride.

Steps of a method or an algorithm described together with exemplary embodiments disclosed herein may be directly implemented by hardware, a software module executed by a processor, or a combination thereof. The software module may reside in a random access memory (RAM), a flash memory, a read only memory (ROM), an erasable programmable ROM (EPROM), an electrically EPROM (EEPROM), registers, a hard disk, a detachable disk, a compact disk read only memory (CD-ROM), or any other type of storage medium known in a technical field to which the present invention pertains. An illustrative storage medium may be combined with the processor. Therefore, the processor may read information from the storage medium and write information in the storage medium. Alternatively, the storage medium may be integrated in the processor. The processor and the storage medium may reside in an application specific integrated circuit (ASIC). The ASIC may be positioned in a user terminal. Alternatively, the processor and the storage medium may reside as separate components in the user terminal.

All of the processors described above may be implemented within software code modules executed by one or more general or special computers or processors and be completely automated via the software code modules. The software code modules may be stored on any type of computer-readable medium or other computer storage device or a set of storage devices. Some or all of the above-mentioned methods may be implemented as an alternative within specialized computer hardware.

All of the methods and the tasks described herein may be executed by a computer system and be sufficiently automated. The computer system may include a plurality of individual computers or computing devices (for example, physical servers, workstations, storage arrays, or the like) communicating with each other through a network and interacting with each other in order to perform the above-mentioned functions, in some cases. Each of the computing device generally includes a processor (or multi-processors or a circuit or a set of circuits, for example, a module) executing program commands or modules stored in a memory or other non-transitory computer-readable storage media. Although some or all of various functions described herein may be implemented by an application-specific circuit (for example, ASICs or field programmable gate arrays (FPGAs) of the computer system, various functions described herein may be implemented by these program commands. When the computer system includes several computing devices, although it is not required for these computing devices to be disposed at the same place, these computing devices may be disposed at the same place. Results of the methods and the tasks disclosed herein may be permanently stored in different forms by conversion physical storage devices such as solid state memory chips and/or magnetic disks.

Although the present invention has been described with reference to exemplary embodiments shown in the accompanying drawings, it is only an example. It will be understood by those skilled in the art that various modifications and other equivalent exemplary embodiments are possible from the present invention. Accordingly, an actual technical protection scope of the present invention is to be defined by the following claims.

What is claimed is:

1. An experience ride representation apparatus for a real-sense media service based on a multi-vision comprising a plurality of screen units for one or more users,
   wherein one of the plurality of screen units reflects a motion of a user in response to a first signal of the user,
   wherein a second signal is transmitted to the user based on real-sense media contents reproduced on the screen unit, and
   wherein metaverse contents are provided to the screen unit, and the real-sense media contents are provided to a remaining screen unit when the screen unit is shared by a plurality of users.

2. An experience ride representation apparatus for a real-sense media service based on a multi-vision, comprising:
   a content server providing real-sense media contents and real-sense effect data corresponding to the real-sense media contents;
   a plurality of screen units reproducing the real-sense media contents;
   a real-sense device providing a real-sense effect to a user based on the real-sense effect data;
   a motion recognizing unit recognizing a motion of the user to generate motion information;
   a motion processing unit reflecting the motion of the user in the screen unit based on the motion information;
   a screen moving unit requesting the motion processing unit to reflect the motion of the user in the screen unit corresponding to a screen moving signal when the motion recognizing unit receives the screen moving signal from the user; and
   a metaverse server providing metaverse contents shared by a plurality of users and metaverse real-sense effect data corresponding to the metaverse contents in the case in which motions of the plurality of users are reflected in the screen unit,
   wherein metaverse contents are provided to the screen unit, and the real-sense media contents are provided to a remaining screen unit when motions of a plurality of users are reflected in the screen unit.

3. The experience ride representation apparatus for a real-sense media service based on a multi-vision of claim 2, wherein the content server includes a content speed controlling unit controlling a reproduction speed of the real-sense media contents reproduced on the screen unit depending on the motion information of the user.

4. The experience ride representation apparatus for a real-sense media service based on a multi-vision of claim 2, wherein the content server includes a content transmitting unit transmitting the real-sense media contents and the real-sense effect data to the screen unit through a communication network.

5. The experience ride representation apparatus for a real-sense media service based on a multi-vision of claim 2, wherein the screen unit reflects the motion of the user as any one or more of an avatar and a character.

6. The experience ride representation apparatus for a real-sense media service based on a multi-vision of claim 2, wherein the motion information recognized by the motion recognizing unit from the motion of the user includes:
   pitch motion information on a motion ascending or descending based on a direction in which the user advances;
   yaw motion information on a motion rotating to the left or the right based on the direction in which the user advances; and
   roll motion information on a motion inclined to the left or the right based on the direction in which the user advances.

7. The experience ride representation apparatus for a real-sense media service based on a multi-vision of claim 2, further comprising a screen connecting unit connecting real-sense media contents reproduced on the screen unit before the screen moving signal is received and real-sense media contents reproduced on the screen unit corresponding to the screen moving signal to each other, when the screen moving unit reflects the motion of the user in the screen unit corresponding to the screen moving signal.

8. The experience ride representation apparatus for a real-sense media service based on a multi-vision of claim 2, further comprising a topographic information providing unit obtaining topographic information from any one of the real-sense media contents and the metaverse contents and requesting the motion processing unit to reflect a real-sense effect corresponding to the topographic information in the screen unit.

9. The experience ride representation apparatus for a real-sense media service based on a multi-vision of claim 8, wherein the topographic information providing unit requests the real-sense device to transfer a physical stimulus to the user through the real-sense device based on the topographic information.

10. An experience ride representation method for a real-sense media service based on a multi-vision, comprising:
    receiving a first signal from a user;
    reflecting a motion of the user in one of a plurality of screen units in response to the first signal;
    transmitting a second signal to the user based on real-sense media contents reproduced on the screen unit; and
    providing metaverse contents to the screen unit, and the real-sense media contents to a remaining screen unit when the screen unit is shared by a plurality of users.

11. An experience ride representation method for a real-sense media service based on a multi-vision, comprising:
    providing, by a content server, real-sense media contents and real-sense effect data corresponding to the real-sense media contents to a screen unit;
    reproducing, by the screen unit, the real-sense media contents;
    providing, by a real-sense device, a real-sense effect to a user based on the real-sense effect data;
    recognizing, by a motion recognizing unit, a motion of the user to generate motion information;
    reflecting, by a motion processing unit, the motion of the user in the screen unit based on the motion information;
    requesting, by a screen moving unit, the motion processing unit to reflect the motion of the user in the screen unit corresponding to a screen moving signal when the motion recognizing unit receives the screen moving signal from the user; and providing, by a metaverse server, metaverse contents shared by a plurality of users and metaverse real-sense effect data corresponding to the metaverse contents in the case in which motions of the plurality of users are reflected in the screen unit, wherein metaverse contents are provided to the screen unit, and the real-sense media contents are provided to a remaining screen unit when motions of a plurality of users are reflected in the screen unit.

12. The experience ride representation method for a real-sense media service based on a multi-vision of claim 11, further comprising controlling, by a content speed controlling unit, a reproduction speed of the real-sense media contents reproduced on the screen unit depending on the motion information of the user.

13. The experience ride representation method for a real-sense media service based on a multi-vision of claim 11, further comprising transmitting, by a content transmitting unit, the real-sense media contents and the real-sense effect data to the screen unit through a communication network.

14. The experience ride representation method for a real-sense media service based on a multi-vision of claim 11, further comprising connecting, by a screen connecting unit, real-sense media contents reproduced on the screen unit before the screen moving signal is received and real-sense media contents reproduced on the screen unit corresponding to the screen moving signal to each other, when the screen moving unit reflects the motion of the user in the screen unit corresponding to the screen moving signal.

15. The experience ride representation method for a real-sense media service based on a multi-vision of claim 11, further comprising:
   obtaining, by a topographic information providing unit, topographic information from any one of the real-sense media contents and the metaverse contents and requesting the motion processing unit to reflect a real-sense effect corresponding to the topographic information in the screen unit; and
   requesting, by the topographic information providing unit, the real-sense device to transfer a physical stimulus to the user through the real-sense device based on the topographic information.

\* \* \* \* \*